Dec. 17, 1968     E. J. POHL ET AL     3,416,630
METHOD AND ARRANGEMENT FOR MONITORING MACHINES BY MEANS
OF THEIR EMITTED SOUND WAVES
Filed April 26, 1967
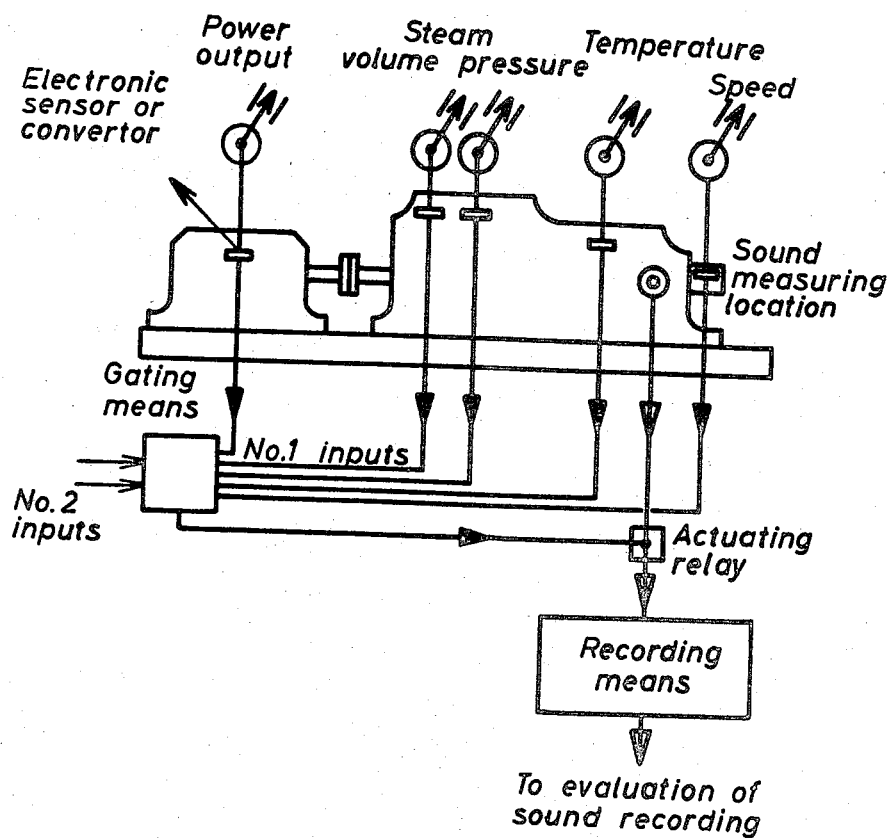

United States Patent Office 3,416,630
Patented Dec. 17, 1968

3,416,630
METHOD AND ARRANGEMENT FOR MONITORING MACHINES BY MEANS OF THEIR EMITTED SOUND WAVES
Ernst J. Pohl, Ebenhausen, Isartal, Karlheinz Gunter Schmitt-Thomas, Ismaning, and Werner Bürck, Neugilching, Germany, assignors to Werkstoff-Untersuchung G.m.b.H., Ismaning, Germany
Filed Apr. 26, 1967, Ser. No. 633,934
Claims priority, application Germany, Apr. 27, 1966, W 41,442
8 Claims. (Cl. 181—.5)

ABSTRACT OF THE DISCLOSURE

Sound waves emitted by a machine when the machine is under normal operating conditions are recorded, together with the values of all pertinent operating parameters at the time. During operation of the machine the pertinent operating parameters are continuously monitored and the sound waves emitted from the machine are re-recorded when all pertinent operating parameters are again equal to the value at which the first recording was made. The two recordings are then compared to see if the machine is malfunctioning.

Background of the invention

This invention relates to methods and arrangements for monitoring machines to determine if they are malfunctioning. In particular it relates to methods and arrangements for monitoring machines by means of the sound emitted from said machines.

Machines of relatively high value are generally monitored in practice by continually measuring significant operating parameters, possibly recording said parameters and comparing them with measurements taken when the machine was operating properly. Lately, the measurement and analysis of sound emitted by the machines has been found to be useful in determining malfunctioning not only of machines such as turbo-generators, but also for machines without moving parts, as for example heat exchangers. The sound may emanate from movable parts or otherwise from steam or gas movement. Its volume, as well as its frequency distribution and the relative and absolute magnitude of each frequency component may yield indications of malfunctioning within the machine.

The invention will be discussed referring to a turbo-generator. It is of course applicable to a great many other machines as well.

In general the frequency spectrum of a turbo-generator is very complex. An obsolute interpretation of the spectral lines contained therein is not possible in the current state of the art. However, comparison of a sound recording made while the machine is operating, to a reference recording made while the machine was known to be in proper operating condition, may yield indications of malfunctioning. For an exact comparison of the recordings, be they recordings made from sound travelling through the air or taken directly from the body of the machine, it is necessary that all pertinent operating parameters are the same, both when the operating recording is made and when the reference recording was previously made. Differences in, for example, the steam supply, even for equal load conditions may cause changes in the sound spectrum, so that a valid comparison is no longer possible. It is therefore essential that all pertinent parameter operating values are the same as the corresponding parameters (parameter reference values) when the reference rcording was made.

It is the usual practice before such sound measurement to check all pertinent operating parameters to see if the requirement for equality with the reference values has been met. However, these readings are generally not made with sufficient accuracy, the measurements are rechecked in intervals of possibly an hour or more, and no attempt is made to see that the parameters remain constant within the time interval necessary for making the sound recording.

Summary of the invention

It is the object of this invention to supply a method and arrangement for monitoring machines by means of the sound emitted from them, wherein the pertinent operating parameter values are kept equal to the reference parameter values throughout the whole time that these sound waves are being recorded, so that the results of these measurements may be useful in determining malfunctioning of the machine.

Thus this invention is a method for monitoring machines emitting sound waves varying with pertinent operating parameters of said machines and also varying if said machines malfunction, wherein a reference sound recording is first made while said machine is known to be in proper operating condition. Simultaneously with the recording of said reference sound recording, the pertinent operating parameters corresponding to the proper operation of the machine at the time are also recorded, furnishing parameter reference values. During further operation of the machine said pertinent operating parameters are measured again, yielding measured parameter operating values. These measured parameter operating values are compared with said parameter reference values and the sound waves emitted by said machine are re-recorded whenever all of said measured operating parameter values are equal within predetermined tolerances to said parameter reference values. The sound recording obtained at this time, namely the operating sound recording, is compared to said reference sound recording to determine if said machine is malfunctioning.

The novel features which are considered as characteristic of the invention are set forth in particular in the appended claims. The improved method itself, however, both as to its construction and its mode of operation, together with additional features and advantages thereof, will be best understood upon perusal of the following detailed description of a specific embodiment with reference to the accompanying drawing, in which the figure shows a monitoring arrangement according to the present invention.

Description of the preferred embodiment

The figure shows an arrangement for monitoring a turbo-generator by means of the sound waves emitted therefrom. Of course, the turbo-generator is used as an example only. The method and arrangement can equally well be applied to other machines. The figure shows a plurality of measuring instruments namely, for purposes of this example, instruments for measuring the delivered power, the steam volume and pressure, the temperature, and the speed of the turbine. Any type of convenient sensing element may be used in measuring these various pertinent operating parameters, although suitable converting means must be furnished so that the output of the sensing elements may be used as inputs to the gating means also shown in the figure. The output of these gating means then serves to energize the pick-up means of the sound recording device also shown in the figure.

The operation of this arrangement will now be discussed step-by-step. It is first determined that the turbo-generator is in perfect operating condition. Measurements are then made of the pertinent operating parameters for which the measuring means are shown in the figure. These measurements are then stored, for example by setting reference means not shown for each parameter, each of said reference means being connected to the gating means (figure) to constitute the No. 2 inputs. Thus said No. 2 inputs constitute the parameter reference values. The No. 1 inputs to the gating means are, as shown in the figure, the inputs resulting from measurements of the pertinent operating parameters during the operation of the monitored machine, namely the parameter operating values. Each of the No. 1 inputs of said gate corresponds to one of the No. 2 inputs. The gating means which may, for example, be electrical AND gates, generate a signal when each parameter operating value is equal to the corresponding parameter reference value within a predetermined tolerance. Setting of the reference means as described above will thus cause a signal to be generated. This signal then causes the recording means to operate, thus making a reference sound recording. As the machine continues to operate, the pertinent operating parameters are continuously measured, thus yielding operating parameter values No. 1 inputs. However, only when these operating parameter values are equal to the parameter reference values found as discussed above or, alternatively, have been equal to them for a predetermined time period, does the gating means again furnish a signal to activate the recording means. Any recording thus made is therefore made under the same operating conditions as was the reference sound recording. The spectral lines of each of these recordings may therefore be obtained and compared. Any differences between the two may be an indication of malfunctioning of the turbo-generator.

It is of course essential for proper operation of the arrangement and method according to this invention that the pertinent operating characteristics are properly chosen. Only these pertinent operating parameters are used to determine whether or not the recording means are energized.

It is also essential that the proper tolerances are determined for each of the operating parameters. Obviously, permitting too great a variation in any one of the parameters may invalidate the sound recordings, while too tight tolerances could make it impossible to get sufficient agreement between the pertinent operating parameters and the reference values of said parameters in order to allow a recording to begin.

The sound measured may either be measured directly on the body of the machine or may be the sound as transmitted through air.

While the invention has been illustrated and described as embodied in a method and arrangement for monitoring equipment by use of the sound waves emitted by said equipment, it is not intended to be limited to the details shown, since various modifications, circuit and structural changes may be made without departing in any way from the spirit of the present invention.

Without further analysis, the foregoing will so fully reveal the gist of the present invention that others can by applying current knowledge readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method for monitoring machines emitting sound waves varying with pertinent operating parameters of said machines and also varying if said machines malfunction, comprising in combination, the steps of pre-recording the sound waves emitted by said machines when said machines are in proper operating condition, thus furnishing a reference sound recording;

measuring said pertinent operating parameters at the time of recording said sound waves under proper operating conditions and storing said values, thus furnishing parameter reference values;

measuring said pertinent operating parameters during the operation of said machines to furnish parameter operating values;

comparing said measured parameter operating values with said parameter reference values and generating a signal when said parameter operating values are substantially equal to said parameter reference values;

finally re-recording the sound waves emitted by said machines when said signal is generated, thus furnishing an operating sound recording;

and comparing said operating sound recording to said reference sound recording to determine if said machine is malfunctioning.

2. A method as set forth in claim 1 wherein said signal is generated when said measured parameter operating values are within a predetermined tolerance of said parameter reference values.

3. A method as set forth in claim 1 wherein said signal is generated when said measured parameter operating values have been substantially equal to said parameter reference values for a predetermined time period.

4. A method as set forth in claim 1 also comprising the steps of analyzing said operating sound recording and said reference sound recording to determine the frequency spectra of said respective records;

and comparing said frequency spectra.

5. A monitoring system for machines emitting sound waves varying with pertinent operating parameters of said machine and also varying if said machines malfunction, comprising, in combination, means for measuring the values of said pertinent operating parameters to furnish parameter operating values;

means for storing the values of said pertinent operating parameters when the machine is known to be in proper operating condition, thus furnishing parameter reference values;

means for comparing said parameter operating values to said parameter reference values and generating a signal when said parameter operating values are equal to said parameter reference values;

recording means activated by said signal and adapted to prerecord the sound waves emanating from said machine when it is known to be in proper operating condition, thus generating a reference sound recording, and further adapted to record the sound waves emitted by said machine when said signal is generated during the subsequent operation of said machine, thus furnishing operating sound recordings;

and means for comparing said operating sound recordings to said reference sound recording to determine if said machine is malfunctioning.

6. A system as set forth in claim 5 wherein said means for comparing said parameter operating values to said parameter reference values comprise electrical gating means.

7. A system as set forth in claim 6 wherein said electrical gating means comprise AND gates connected in such a manner that said signal is generated only when each of said measured parameter operating values is equal to its corresponding parameter reference value.

8. A system as set forth in claim 6 also comprising converting means for converting said measured parameter operating values and said parameter reference values to corresponding electrical signals, suitable for activating said electrical gating means.

References Cited

UNITED STATES PATENTS

| 3,070,995 | 1/1963 | Broder et al. | 73—6 |
| 3,201,776 | 8/1965 | Morrow et al. | 73—71.4 |
| 3,277,695 | 10/1966 | Joline | 73—71 |

BENJAMIN A. BORCHELT, *Primary Examiner.*

G. H. GLANZMAN, *Assistant Examiner.*

U.S. Cl. X.R.

73—71.4, 116